United States Patent [19]

Lavoie

[11] Patent Number: 4,529,915
[45] Date of Patent: Jul. 16, 1985

[54] CRT FOCUS CONTROL CIRCUIT

[75] Inventor: Marvin E. Lavoie, Aloha, Oreg.

[73] Assignee: Tektronix, Inc., Beaverton, Oreg.

[21] Appl. No.: 576,239

[22] Filed: Feb. 2, 1984

[30] Foreign Application Priority Data

Mar. 18, 1983 [JP] Japan ............................. 58-38524[U]

[51] Int. Cl.³ ............................................. H01J 29/58
[52] U.S. Cl. ..................................... 315/382; 315/371
[58] Field of Search ........................ 315/382, 370, 371;
250/310, 311

[56] References Cited

U.S. PATENT DOCUMENTS 3,961,223  6/1976  Ray et al. ............................ 315/382
4,162,403  7/1979  Baumgarten ........................ 250/311
4,249,112  2/1981  McKibben .......................... 315/382

Primary Examiner—Theodore M. Blum
Attorney, Agent, or Firm—George T. Noe

[57] ABSTRACT

A focus control circuit particularly well suited for use with a cathode-ray tube having a quadrapole lens includes automatic tracking focus and astigmatism features to ensure a well-focused display with minimum focus readjustment.

3 Claims, 3 Drawing Figures

CRT FOCUS CONTROL CIRCUIT

BACKGROUND OF THE INVENTION

Cathode-ray tubes (CRTs) have widely been recognized as important display devices for visually displaying images, waveforms, graphs, characters, etc. Fast writing speed and brighter image intensity are two important features of CRTs over other two dimensional display devices. CRTs are especially key display devices for oscilloscopes.

CRTs comprise a neck portion including an electron gun and deflection plates, a faceplate portion on the inner surface of which a phosphor screen is provided, and a funnel portion coupling the foregoing two portions. As shown in FIG. 1, an electron gun in the neck portion 12 of CRT 10 comprises cathode 14, first control grid 16, second grid 18, focus electrode 20 and astigmatism electrode 22. For indirect heating type CRTs, heater electrode 15 is used to heat the oxide layer of cathode 14 to emit thermionic electrons therefrom.

Operation potentials to various electrodes of the electron gun are typically as follows: A constant negative high voltage ($-HV$) of about $-3$ kV is normally applied to cathode 14. A floating DC voltage source 24 elevated to the cathode potential ($-HV$) is connected to heater 15 to heat up cathode 14. Connected to control grid 16 is another high voltage source 26 floated by the output from Z-axis amplifier 28 which controls the beam intensity during sweep periods, blanking/unblanking depending on sweep/sweep retrace periods, and chop blanking. Neon tubes 30a and 30b are connected between control electrode 16 and cathode 14 to protect the triode section of the electron gun from excessive voltage. Although not shown, a constant voltage is applied to second grid 18. The focus voltage is controlled by a voltage divider including focus control potentiometer 32 and a few other resistors connected in a string between cathode 14 and a reference potential source. Finally, a controllable voltage at the wiper arm of astigmatism control potentiometer 34 is applied to astigmatism electrode 22.

The electron beam emitted from cathode 14 is well focused on faceplate 11 by controlling focus control potentiometer 32 and astigmatism control potentiometer 34. Optimum focus and astigmatism voltages are a function of the control grid bias voltage and potentiometers 32 and 34 are varied as the grid bias voltage is changed so as to increase or decrease the beam current. Hitherto, such focus and astigmatism voltages were controlled independently so that the electron beam is well focused on the phosphor screen. Such readjustment is time consuming and impractical, especially when the beam current or the grid bias voltage is varied to different levels in synchronism with vertical channel switching or horizontal sweep period of a multichannel, alternate sweep oscilloscope.

SUMMARY OF THE INVENTION

This device comprises a pair of voltage sources for generating focus and astigmatism control voltages, a pair of operational amplifiers each including input and feedback reistors, and an interconnection resistor for coupling the focus control voltage to the operational amplifier for the astigmatism control. The output signals from each operational amplifier are used to control the focus and astigmatism electrodes.

It is therefore an object of this invention to provide an improved focus and astigmatism control circuit with minimum interaction.

It is another object of this invention to provide a focus control circuit wherein astigmatism voltage is automatically set to substantially optimum level as the focus control is adjusted.

It is yet another object of this invention to provide a focus control circuit well suited for CRTs employing quadrapole lenses.

It is still another object of this invention to provide a focus control circuit in which no astigmatism voltage readjustment is needed if once adjusted initially.

Other objects, features, and advantages will become apparent to those skilled in the art upon a reading of the following description when taken in conjunction with the accompanying drawings.

DETAILED DESCRIPTION OF THE INVENTION

Figure 1:
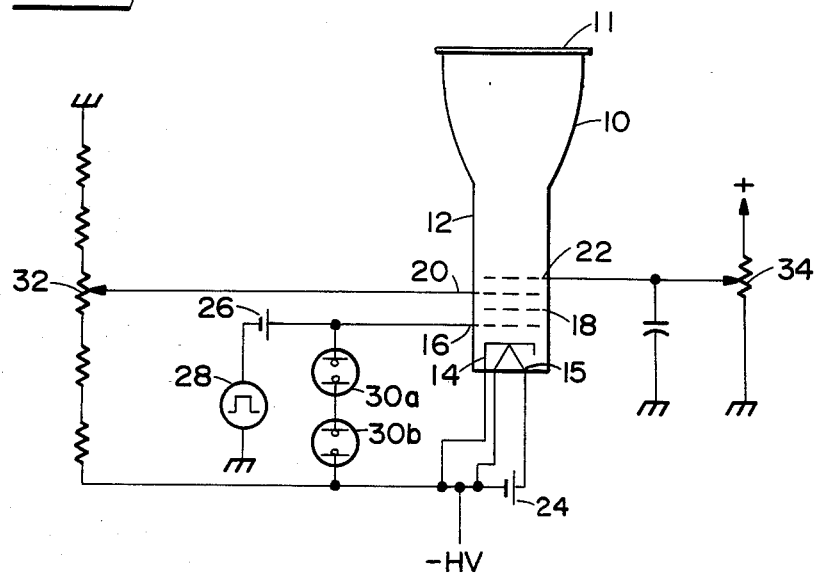
FIG. 1 is a prior art focus control circuit.
Figure 2:
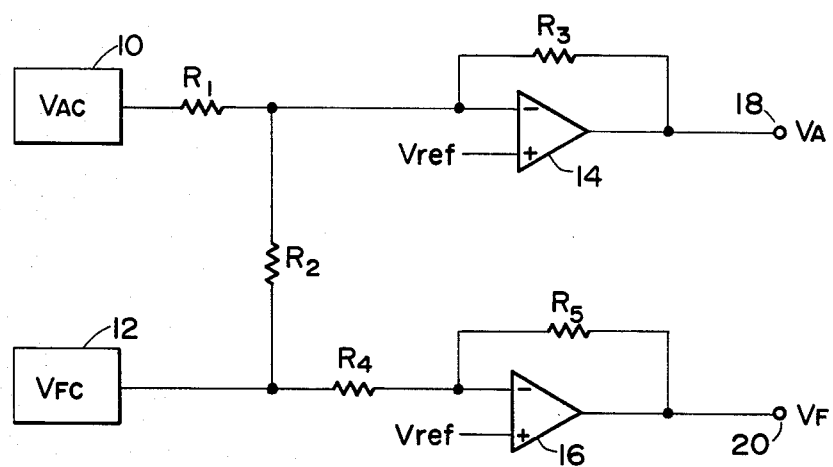
FIG. 2 is a simplified circuit schematic illustrating the principle of the focus control circuit according to this invention.

Referring now to FIG. 2, a focus control circuit according to this invention is illustrated in simplified form. Astigmatism control voltage source ($V_{AC}$) 10 and focus control voltage source ($V_{FC}$) 12 are each a controllable voltage source that may be a potentiometer. Output voltages from such control voltage sources 10 and 12 are coupled respectively through input resistors $R_1$ and $R_4$ to the inverting input of respective amplifiers 14 and 16, each including respective feedback resistors $R_3$ and $R_5$ connected between the output and inverting input terminals. Applied to the non-inverting input terminals of amplifiers 14 and 16 is reference voltage $V_{ref}$. Additionally, interconnection resistor $R_2$ is connected directly between the output of $V_{FC}$ 12 and the inverting input terminal of amplifier 14. Astigmatism and focus control output voltages $V_A$ and $V_F$ are derived respectively from output terminals 18 and 20 of amplifiers 14 and 16.

In operation, $V_{FC}$ is amplified by the operational amplifier including amplifier 16 to provide the output signal $V_F$ at the output terminal 20. As is well known by those persons skilled in the art, $V_F$ is given by the following expression:

$$V_F = -\frac{R_5}{R_4} V_{FC} + \left(1 + \frac{R_5}{R_4}\right) V_{ref} \quad (1)$$

Similarly, $V_{AC}$ is amplified by the operational amplifier connected thereto. However, $V_{FC}$ is also amplified by the same amplifier to provide the output voltage $V_A$. The output astigmatism control voltage $V_A$ is therefore given by the following expression:

$$V_A = -\frac{R_3}{R_1} V_{AC} + \left(1 + \frac{R_3}{R_1}\right) V_{ref} + \frac{R_3}{R_2} V_{FC} + \quad (2)$$

$$\left(1 + \frac{R_3}{R_2}\right) V_{ref}$$

$$= -R_3\left(\frac{V_{AC}}{R_1} + \frac{V_{FC}}{R_2}\right) + \left(2 + \frac{R_3}{R_1} + \frac{R_3}{R_2}\right) V_{ref}$$

Proper selection of the circuit parameters allows us to provide the desired astigmatism control voltage $V_A$. It should be noted that $V_{AC}$ does not affect $V_F$ because the upper end of interconnection resistor $R_2$ remains constant voltage ($V_{ref}$) regardless of the astigmatism control voltage $V_{AC}$. In this circuit arrangement, astigmatism control may be made initially and further readjustment is essentially eliminated, thereby releasing the operator from the burden of time consuming adjustment to provide a proper electron lens.

Figure 3:
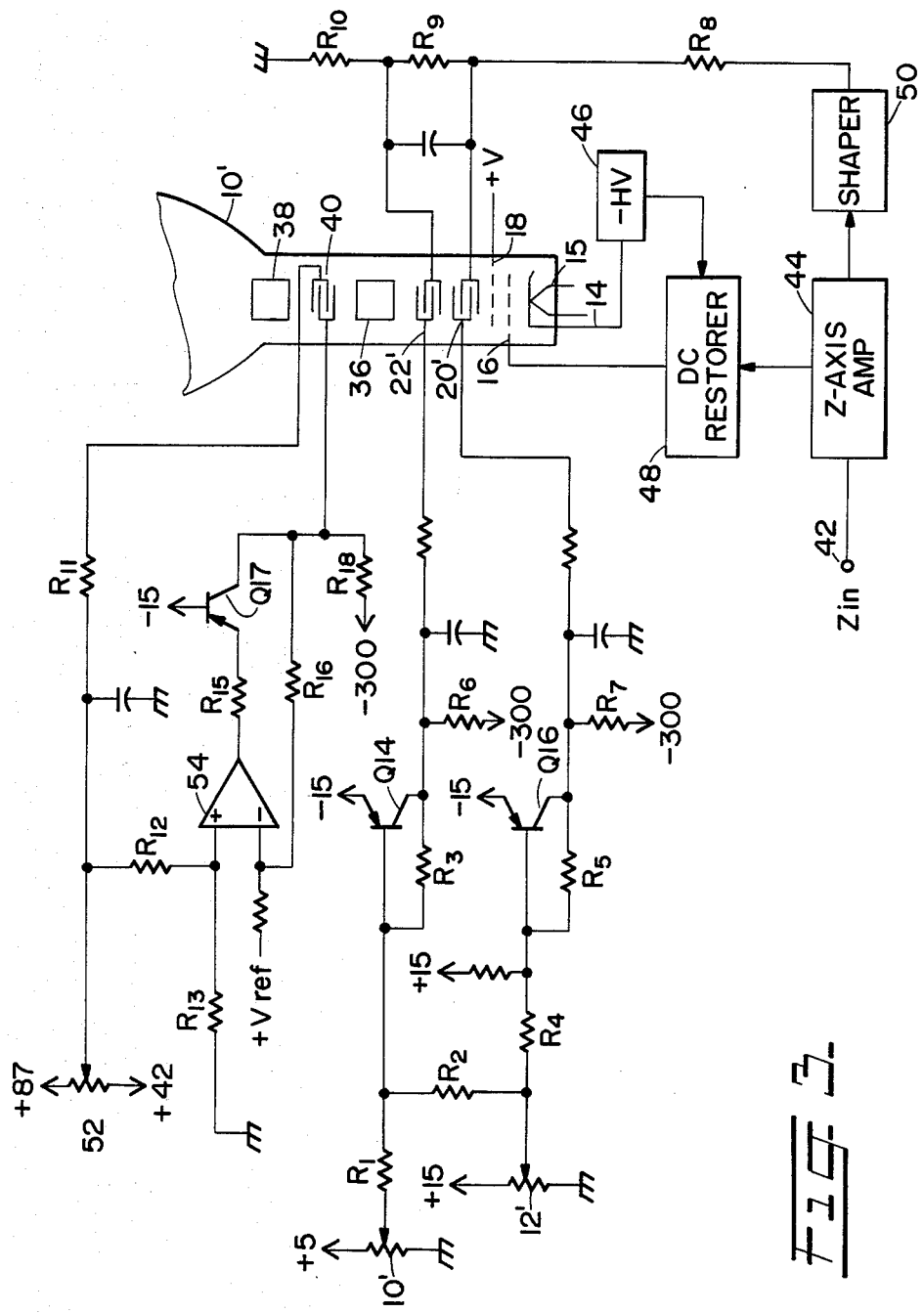
FIG. 3 is an electrical circuit schematic of a practical embodiment of the present focus control circuit applied to a CRT with quadrapole lenses.

Shown in FIG. 3 is a practical embodiment of the focus control apparatus for a quadrapole lens CRT system employing this invention. CRT 10' includes cathode 14, control grid 16, second grid 18, vertical deflection means 36, horizontal deflection means 38, and three quadrapole lenses 20', 22' and 40. Quadrupolar lenses are well known in the art and therefore no lengthy description is necessary.

Coupled to cathode 14 of CRT 10' is negative high voltage source (−HV) 46 of approximately −2 kV that is generated by using any well known high voltage generators including preferably an oscillator, a step-up transformer and a rectifier/smoothing circuit. A control grid voltage is derived from DC restorer 48 that receives −HV from high voltage source 46 and the output Z-axis signal from Z-axis amplifier 44. Z-axis input signals are supplied to Z-axis amplifier 44 by way of input terminal 42. A constant voltage is applied to second grid 18.

Focus and astigmatism electrodes 20' and 22' are controlled by the intercoupled control voltages described hereinbefore by reference to FIG. 2. Potentiometers 10' and 12' act as astigmatism and focus control voltage sources. Transistors $Q_{14}$ and $Q_{16}$ correspond to amplifiers 14 and 16 in FIG. 2, respectively. Similar reference numerals are used to represent like elements. The collector output voltages are applied respectively to one pair of electrode of respective quadrapole lenses 22', 20' as astigmatism and focus control voltages. Applied to the other pair of each quadrapole lens is the output from Z-axis amplifier 44 by way of signal shaping circuit 50 that converts the Z-axis output signal into an exponentially related signal for dynamic focus control purposes. The dynamic focus control itself is also a known technique to automatically control the focus of the electron beam in accordance with the beam current. In other words, the exponentially related signal applied via resistive divider $R_8$ and $R_{10}$ increases the strength of the electron lenses more at higher CRT beam current. A proper transfer function of waveform shaping circuit 50 is experimentally determined by the CRT 10'.

Additional focusing quadrapole lens 40 is employed primarily for edge focus correction. Potentials to two pairs of the lens 40 are derived from edge focus control potentiometer 52 by way of series resistor $R_{11}$ and also the output of non-inverting amplifier including amplifier 54 and boost transistor $Q_{17}$. A reference voltage +$V_{ref}$ is applied to the inverting input of amplifier 54 through $R_{14}$ and the wiper arm potential of potentiometer 52 to the non-inverting input of amplifier 54 through input resistor $R_{12}$. Feedback resistor $R_{16}$ is connected between the collector of $Q_{17}$ and the negative input of amplifier 54. As is well known to those skilled in the art, the collector output voltage ($V_{AF}$) of $Q_{17}$ is substantially given by the following expression:

$$V_{AF} = -\frac{R_{16}}{R_{14}} V_{ref} + \frac{R_{13}(R_{14} + R_{16})}{R_{14}(R_{12} + R_{13})} V_i \quad (3)$$

where $V_i$ represents the wiper arm voltage of potentiometer 52. $V_{AF}$ is therefore determined by +$V_{ref}$ but modified by the wiper arm potential $V_i$. In the particular embodiment, $R_{12}=R_{16}$ and $R_{13}=R_{14}$. The above expression (3) can be modified:

$$V_{AF} = -\frac{R_{16}}{R_{14}} V_{ref} + V_i \quad (4)$$

The potential difference between the two pairs of electrodes remains constant and the potential of the one electrode pair coupled to the collector of $Q_{17}$ is less negative in potential with respect to the other pair by $$\frac{R_{16}}{R_{14}} V_{ref}$$

that may be approximately 150 volts in one practical embodiment.

Although not shown in FIG. 3, output deflection signals from vertical and horizontal deflection amplifiers are applied respectively to vertical and horizontal deflection means 36 and 38 for vertical and horizontal deflection of the electron beam.

It should be understood that the shown embodiments are merely examples to apply this device to actual products and many changes and modifications may be made to best fit particular applications without departing from the broadest concept of this device. For example, non-linear devices may be included in the interconnection path between the two controls.

I claim:

1. A focus control circuit for a cathode-ray tube having focus and astigmatism electrodes, comprising:
    means for generating a variable focus control voltage;
    a first amplifier the input of which is coupled to said focus control voltage generating means and the output of which is coupled to said focus electrode;
    means for generating a variable astigmatism control voltage;
    a second amplifier the input of which is coupled through a first resistor to said astigmatism control voltage generating means and the output of which is coupled to said astigmatism electrode; and
    a second resistor connected from the input of said second amplifier to said focus control voltage generating means.

2. A focus control circuit in accordance with claim 1 wherein said first and second amplifiers are operational amplifiers each including input and feedback resistors.

3. A focus control circuit in accordance with claim 1 wherein the focus and astigmatism electrodes of the cathode-ray tube are quadrapole lenses.

* * * * *